(12) United States Patent
Srivastava et al.

(10) Patent No.: US 11,294,909 B2
(45) Date of Patent: Apr. 5, 2022

(54) DETECTION AND UTILIZATION OF ATTRIBUTES

(71) Applicant: International Business Machines Corporation, Armonk, NY (US)

(72) Inventors: Dhanashree Srivastava, Pune (IN); Arjen W. van der Broek, Vijlen (NL)

(73) Assignee: International Business Machines Corporation, Armonk, NY (US)

(*) Notice: Subject to any disclaimer, the term of this patent is extended or adjusted under 35 U.S.C. 154(b) by 138 days.

(21) Appl. No.: 16/524,347

(22) Filed: Jul. 29, 2019

(65) Prior Publication Data
US 2019/0354531 A1    Nov. 21, 2019

Related U.S. Application Data

(63) Continuation of application No. 15/397,806, filed on Jan. 4, 2017, now Pat. No. 10,394,823.

(51) Int. Cl.
*G06F 16/2457* (2019.01)
*G06F 16/22* (2019.01)

(52) U.S. Cl.
CPC ........ *G06F 16/24575* (2019.01); *G06F 16/22* (2019.01); *G06F 16/24578* (2019.01)

(58) Field of Classification Search
CPC ............... G06F 16/24575; G06F 16/22; G06F 16/24578
See application file for complete search history.

(56) References Cited

U.S. PATENT DOCUMENTS

| | | | |
|---|---|---|---|
| 6,334,110 B1 | 12/2001 | Walter et al. | |
| 8,249,920 B2 | 8/2012 | Smith | |
| 8,458,033 B2 | 6/2013 | Graham | |
| 8,799,814 B1 * | 8/2014 | Bryc .................. | G06Q 30/0201 715/811 |
| 10,394,823 B2 | 8/2019 | Srivastava et al. | |
| 2001/0044795 A1 | 11/2001 | Cohen et al. | |
| 2003/0037034 A1 | 2/2003 | Daniels et al. | |
| 2003/0088458 A1 | 5/2003 | Afeyan et al. | |

(Continued)

OTHER PUBLICATIONS

Menon et al., "How well do you know your partner? Strategies for formulating proxy-reports and their effects on convergence to self-reports," Journal of Marketing Research 32.1 (1995): 75-84. (Year: 1995).*

(Continued)

*Primary Examiner* — Jay A Morrison
(74) *Attorney, Agent, or Firm* — Schmeiser, Olsen & Watts, LLP; Brian Restauro

(57) ABSTRACT

A method and system of improving the detection and utilization of attributes of a user. A query is sent to a device operated by a user. The query includes a query database having a plurality of query tags corresponding to expected attributes of a target user and a numerical value associated with each of the plurality of query tags. A plurality of attributes of the user of the device is detected. Data corresponding to the detected plurality of attributes of the user and a response from the user related to the query is received. The numerical value associated with each of the plurality of query tags that corresponds with each of the detected plurality of attributes and creating a new query tags is incremented.

17 Claims, 12 Drawing Sheets

(56) References Cited

U.S. PATENT DOCUMENTS

| | | | |
|---|---|---|---|
| 2005/0055357 A1 | 3/2005 | Campbell | |
| 2008/0306790 A1 | 12/2008 | Otto et al. | |
| 2009/0106092 A1 | 4/2009 | Bowers | |
| 2012/0150586 A1 | 6/2012 | Harper et al. | |
| 2012/0226743 A1 | 9/2012 | Smargon | |
| 2012/0246000 A1* | 9/2012 | Yarvis | G06Q 30/02 705/14.53 |
| 2013/0018838 A1 | 1/2013 | Parnaby et al. | |
| 2013/0173413 A1 | 7/2013 | Page et al. | |
| 2013/0218669 A1* | 8/2013 | McNulty | G06Q 30/02 705/14.45 |
| 2013/0231974 A1 | 9/2013 | Harris et al. | |
| 2014/0006198 A1 | 1/2014 | Daly et al. | |
| 2014/0214480 A1 | 7/2014 | Jamal et al. | |
| 2014/0278992 A1* | 9/2014 | Roundtree | G06Q 30/0257 705/14.55 |
| 2015/0234939 A1* | 8/2015 | Aharony | G06F 16/9537 707/737 |
| 2018/0189357 A1 | 7/2018 | Srivastava et al. | |

OTHER PUBLICATIONS

Pamela Vaughan, Where Marketers Go to Grow, How Closed-Loop Marketing Works, Apr. 12, 2012, http://blog.hubspot.com/blog/tabid/6307/bid/32341/How-Closed-Loop- . . . , 8 pages.

Ian Michiels, Closing the Loop on Marketing Strategies, May 22, 2008, http://www.crmbuyer.com/story/63083.html, 4 pages.

Office Action (dated Nov. 20, 2018) for U.S. Appl. No. 15/397,806, filed Jan. 4, 2017.

Amendment (dated Feb. 19, 2019) for U.S. Appl. No. 15/397,806, filed Jan. 4, 2017.

Notice of Allowance (dated Apr. 30, 2019) for U.S. Appl. No. 15/397,806, filed Jan. 4, 2017.

\* cited by examiner

| QUERY DATABASE 114 ||||
|---|---|---|---|
| QUERY 1 116 || QUERY 2 118 ||
| ORIGINAL TAG | VALUE | ORIGINAL TAG | VALUE |
| MALE 130a / 134a | 0 | FEMALE 136a / 132a | 0 |
| OVER 30 130b / 134b | 0 | UNDER 30 136b / 132b | 0 |
| HAS CHILDREN 130c | 0 134c | SINGLE 132c | 0 136c |
| SUBURBAN LOCATION 130d | 0 134d | URBAN LOCATION 132d | 0 136d |

FIG. 2

| USER DATABASE {120} | |
|---|---|
| 1ST USER {122} | 2ND USER {124} |
| MALE {146a} | FEMALE {148a} |
| OVER 30 {146b} | UNDER 30 {148b} |
| SINGLE {146c} | SINGLE {148c} |
| URBAN LOCATION {146d} | SUBURBAN LOCATION {148d} |

(TAGS)

FIG. 3

| QUERY DATABASE (114) ||||
| --- | --- | --- | --- |
| QUERY 1 (116) || QUERY 2 (118) ||
| ORIGINAL TAG | VALUE | ORIGINAL TAG | VALUE |
| MALE | 1 | FEMALE | 1 |
| OVER 30 | 1 | UNDER 30 | 1 |
| HAS KIDS | 0 | SINGLE | 1 |
| SUBURBAN LOCATION | 0 | URBAN LOCATION | 0 |
| AUTOMATICALLY GENERATED TAGS | VALUE | AUTOMATICALLY GENERATED TAGS | VALUE |
| URBAN LOCATION | 1 | SUBURBAN LOCATION | 1 |
| SINGLE | 1 | | |

FIG. 4

| QUERY DATABASE ||||||
| --- | --- | --- | --- | --- | --- |
| QUERY 1 || QUERY 2 || QUERY 3 ||
| ORIGINAL TAG | VALUE | ORIGINAL TAG | VALUE | ORIGINAL TAG | VALUE |
| MALE | 500 | FEMALE | 1000 | FEMALE | 0 |
| OVER 30 | 530 | UNDER 30 | 1200 | SINGLE | 0 |
| HAS KIDS | 300 | SINGLE | 1010 | OVER 30 | 0 |
| SUBURBAN | 1000 | URBAN | 300 | SUBURBAN | 0 |
| AUTOMATICALLY GENERATED TAGS | VALUE | AUTOMATICALLY GENERATED TAGS | VALUE | | |
| URBAN | 100 | SUBURBAN | 200 | | |
| SINGLE | 800 | KIDS | 50 | | |
| FEMALE | 700 | MALE | 200 | | |
| UNDER 30 | 200 | 30 - 40 | 50 | | |
| RURAL | 50 | 40 - 50 | 75 | | |
| | | 60 + | 200 | | |
| | | RURAL | 700 | | |

FIG. 5

| QUERY DATABASE | | |
|---|---|---|
| QUERY 4 | | |
| | TAG | VALUE |
| ORIGINAL | MALE | 500 |
| | OVER 30 | 530 |
| | HAS KIDS | 300 |
| | SUBURBAN | 1000 |
| AUTO-GENERATED | URBAN | 100 |
| | RURAL | 50 |
| | UNDER 30 | 700 |
| INTENDED USER | SPOUSE | 50 |
| | CHILD | 100 |
| | FRIEND | 10 |
| | FAMILY | 251 |

FIG. 6

DETECTION AND UTILIZATION OF ATTRIBUTES

This application is a continuation application claiming priority to Ser. No. 15/397,806, filed Jan. 4, 2017, now U.S. Pat. No. 10,394,823 issued Aug. 27, 2019.

FIELD

The present invention relates generally to a method for improving the detection and utilization of attributes of a user and in particular to a method and associated system for intelligently detecting the attributes of a user and intelligently using the detected attributes to identify additional users or additional queries to provide users.

BACKGROUND

Existing methods today fail to intelligently identify potential users outside the originally identified intended user segment for a given proposed query. Existing methods further do not adequately capture the context of a user's decision to engage or respond to the proposed query. Accordingly, there exists a need in the art to overcome at least some of the deficiencies and limitations described herein above.

SUMMARY

According to one embodiment, the present invention provides a method and assorted computer program product and computer system, of improving the detection and utilization of attributes of a user. A computer processor sends a query to a device operated by a user of the device, wherein the query includes a query database having: a plurality of query tags corresponding to expected attributes of a target user; and a numerical value associated with each of the plurality of query tags. A plurality of attributes of the user is detected. The computer processor receives data corresponding to the detected plurality of attributes of the user and a response from the user related to the query. The computer processor automatically increments based on the response, by the computer processor, the numerical value associated with each query tag of the plurality of query tags that corresponds to each detected attribute of the detected plurality of attributes. The computer processor creates a new query tag in the query tag database for each of the detected plurality of attributes that does not have a corresponding query tag in the query tag database. The computer processor stores a numerical value associated with each new query tag.

BRIEF DESCRIPTION OF THE DRAWINGS

FIG. 2 illustrates an initial query database of the system of FIG. 1, in accordance with one embodiment.

FIG. 3 illustrates a user database of the system of FIG. 1, in accordance with one embodiment.

FIG. 4 illustrates the query database of FIG. 2 after receiving data from the user database of FIG. 3, in accordance with one embodiment.

FIG. 5 illustrates the query database of FIG. 2 after receiving additional data, in accordance with one embodiment.

FIG. 6 illustrates another query database of the system of FIG. 1, in accordance with one embodiment.

DETAILED DESCRIPTION

Figure 1:
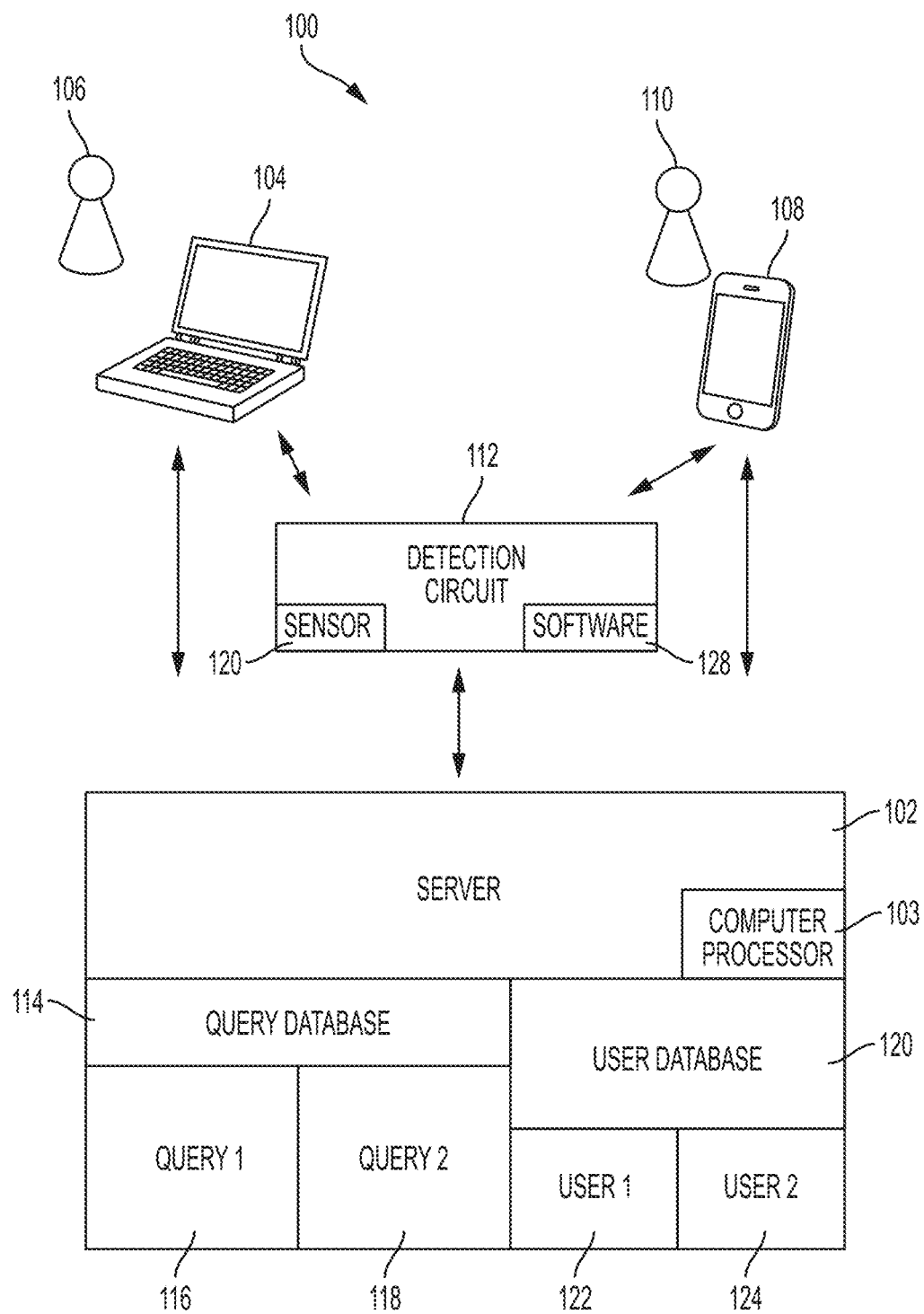
FIG. 1 illustrates a system for improving the detection and utilization of attributes of a user, in accordance with one embodiment.

FIG. 1 illustrates a system 100 for improving the detection and utilization of attributes of a user, in accordance with one embodiment. The system 100 includes a server 102, a first device 104 operated by a first user 106, a second device 108 operated by a second user 110 and a detection circuit 112. The server 102 is shown connected to the detection circuit 112. Further, the server 102 includes a query database 114 containing information associated with a first query 116 and a second query 118. The server 102 further includes a user database 120 including information associated with the first user 122 and information associated with the second user 124.

The server 102 and the detection circuit 112 each may comprise an embedded computer. An embedded computer is defined herein as a remotely portable dedicated computer comprising a combination of computer hardware and software (fixed in capability or programmable) specifically designed for executing a specialized function. Programmable embedded computers may comprise specialized programming interfaces. Additionally, the server 102 and the detection circuit 112 may each comprise a specialized hardware device(s) comprising specialized (non-generic) hardware and circuitry (i.e., specialized discrete non-generic analog, digital, and logic based circuitry) for executing a process described with respect to FIGS. 1-11. The specialized discrete non-generic analog, digital, and logic based circuitry may include proprietary specially designed components (e.g., a specialized integrated circuit such as an application specific integrated circuit (ASIC) designed for only implementing an automated process for deploying a dynamic security deployment environment. The server 102 and the detection circuit 112 may each comprise associated servers. The server 102 and the detection circuit 112 may each include a memory system, software, and control hardware (sensors, interfaces, and associated co hardware) for enabling the soft are to communicate with each other and with the user devices 104, 108 and execute a process for improving the detection and utilization of attributes of a user. The memory system may include a single memory system. Alternatively, the memory system may include a plurality of memory systems. The server 102 and the detection circuit 112 may each comprise any type of hardware devices (comprising embedded circuitry for only performing an automated process for improving the detection and utilization of attributes of a user).

The server 102 may be or may include a web server, an ad server a content delivery network, or the like. The server 102 may include a computer processor 103 configured to make the computations contemplated herein. The server 102 may include a storage location for storing information such as the query database 114 and the user database 120. The server 102 may further be capable of communication with each of the detection circuit 112 and the devices 104, 108 of the system 100. This communication may be through wired or wireless connections through both or either cellular, broadband or the like.

FIG. 2 illustrates the initial query database 114 of the system of FIG. 1, in accordance with one embodiment. The query database 114 is shown after each of the first query 116 and the second query 118 are created. The first query 116 and the second query 118 may be an offer or advertisement, an event invitation, a job offer, or any other inquiry that requires or requests a response from a user such as the user 106, 110. The queries 116, 118 may take the form of, for example, a video advertisement, a push advertisement, an email advertisement, an email event invitation, a software application available for download on a digital market, a text advertisement, an image advertisement, or the like. The query database 114 includes the information associated with the first query 116 and the second query 118.

Each query of the first query 116 and the second query 118 may be created in a manner whereby the creator identifies a target audience that is expected to respond positively to the query 116, 118. The information associated with the first query 116 includes a plurality of query tags 130a, 130b, 130c, 130d corresponding to expected attributes of a target user. The query tags contemplated may include tags related to various types of attributes of a target user. For example, the query tags may be a temporal tag, an emotional tag, a behavioral tag, and a situational tag relating to temporal, emotional, behavioral or situational attributes that are associated with the target user.

In response to the input from the creator of the query related to the expected attributes of the target user, the server 102 may populate the query database 114 with the query tags 130a, 130b, 130c, 130d. For the first query 116, four query tags 130a, 130b, 130c, 130d have been identified: the query tag 130a is input, provided or otherwise identified as "male", the query tag 130b is input, provided or otherwise identified as "over 30", the query tag 130c is input, provided or otherwise identified as "has children" and the query tag 130d is input, provided or otherwise identified as "suburban location." Thus, the expected or target attributes for the first query 116 is identified as an over 30 year old male that has children and lives in a suburban location. Similarly, for the second query 118, four query tags 132a, 132b, 132c, 132d have been provided: the query tag 132a that is input, provided or otherwise identified as "female", the query tag 132b is input, provided or otherwise identified as "under 30", the query tag 132c is input, provided or otherwise identified as "single" and the query tag 132d is input, provided or otherwise identified as "urban location." The expected or target attributes for the second query 118 is identified as an under 30 year old female that is single and lives in an urban location. More, less and/or different query tags are contemplated and it should be understood that the particular tags shown are for exemplary purposes.

A separate numerical value 134a, 134b, 134c, 134d, 136a, 136b, 136c, 136d is associated with each of the plurality of query tags 130a, 130b, 130c, 130d, 132a, 132b, 132c, 132d for each of the first and second queries 116, 118. Each of these numerical values 134a, 134h, 134c, 134d, 136a, 136b, 136c, 136d is initially set at zero in the embodiment shown. However, other values greater than or less than zero may be set as initial values at the time of the creation of the query 116, 118 and the population of the query tags 130a, 130b, 130c, 130d, 132a, 132b, 132c, 132d within the query database 114.

FIG. 3 illustrates the user database 120 of the system of FIG. 1, in accordance with one embodiment. The user database 120 includes the information related to the first user 122, and the information related to the second user 124. The information related to the first user 122 includes a plurality of user tags 146a, 146b, 146c, 146d. The user tag 146a is input, provided or otherwise identified as "male," the user tan 146b is input, provided or otherwise identified as "over 30," the user tag 146c is input, provided or otherwise identified as "single" and the user tag 146d is input, provided or otherwise identified as "urban location." The information related to the second user 124 includes a plurality of user tags 148a, 148b, 148c, 148d. The user tag 148a is input, provided or otherwise identified as "female," the user tag 148b is input, provided or otherwise identified as "under 30," the user tag 148c is input, provided or otherwise identified as "single" and the user tag 148d is input, provided or otherwise identified as "suburban location." More, less and/or different user tags are contemplated and it should be understood that the particular tags shown are for exemplary purposes. The user database 120 is shown stored by the server 102 but it may additionally or alternatively be stored locally in each of the devices 116, 118. If stored in the devices 116, 118 or at another location, the server 102 may communicate with the device 116, 118 in order to request the information from the remote user database 120 when information is necessary to perform the methods and functionality described herein.

Referring back to FIG. 1, the detection circuit 112 may be configured to detect one or more attributes of the users 106, 110. Data representing the attributes detected by the detection circuit 112 may be provided to the server 102 whereby the server 102 may be configured to store this data in the user database 120 in the form of the user tags 146, 148. In one embodiment, the server 102 may be provided with information and may be configured to use this information in order to determine an attribute that the information represents. For example, if the detection circuit 112 provides text input information originating from a user, the server 102 may be configured to analyze the text input information in order to determine a particular personality characteristic of the user (i.e. shy, angry, happy, sad) based on the text input acquired by the detection circuit 112.

The detection circuit 112 may be configured to detect attributes about the user 106, 110 such as sex, age, personality, emotion, location, time of day, season, whether the user is responding on behalf of another user, sexual orientation, demographical information, and the channel through which the user 106, 110 and the devices 104, 108 are connected to the server 102. These attributes may all be stored by the server 102 as the user tags 146, 148 in the user database 120.

The detection circuit 112 is shown including at least one sensor 126 and software 128. The detection circuit 112 may be a physiological detection circuit for detecting, for example, biometric information from the users 106, 110, The at least one sensor 126 may include a plurality of specialized sensors that are configured to sense physiological attributes of the user 116, 118. The at least one sensor 126 may sense biometric information. The software 128 may be particularly configured to convert this biometric information into data that may be processed by the server 102. The plurality of sensors may include at least one of an image sensing device that can detect facial features, a retina scanning device, a pulse sensing device, a blood pressure sensing device, a temperature sensing device, and a respiration sensing device. These sensors may be configured to receive data related to biometric or physiological attributes of the user 116, 118. These biometric attributes may all be stored by the server 102 as user tags in the user database 120 such as the user tags 146, 148.

In another embodiment, the detection circuit 112 may detect one or more user inputs. The software 128 may be particularly adapted to instruct the detection circuit 112 or the server 102 to perform an analysis of the user inputs in order to determine user attributes that derive from the user inputs. For example, the detection circuit 112 may be configured to determine personality attributes such as romantic, realistic, judgmental, punctual, and the like based on the user input information detected or otherwise received. The user inputs may be provided, gathered or otherwise detected by the detection circuit 112 through a connection with another website or program or with the sever 102. For example, the detection circuit 112 may be connected to a social media web server (not shown) where a user may input information. This information may be gathered by the detection circuit 112 for analysis. These personality attributes may all be stored by the server 102 as user tags in the user database 120 such as the user tags 146, 148.

In another embodiment, the detection circuit 112 may gather information by directly requesting that the user 106, 110 provides information. For example, the server 102 or the detection circuit 112 may require or request that the user 106, 110 to provide attribute information. For example, the server 102 or the detection circuit 112 may request that the user 106, 110 provide age, sex, and location information when creating a user profile associated with a particular website hosted by the server 102 or another server that is operable with the server 102. This information may be stored in the user database 120 as the user tags 146, 148.

It should be understood that detection circuit 112 may gather information about the users 106, 110 in various other forms. For example, spending habits with the server 102 or with servers associated with the server 102 may be gathered. In the event that the server 102 hosts email, the server 102 and the detection circuit 112 may detect various forms of user inputs such as email response tendencies, text input and the like.

The first device 104 is shown as a laptop computer and the second device 108 is shown as a mobile communicator. Other devices are also contemplated that may be operable by the users 106, 110 including but not limited to desktop computers, wearable devices, larger portable electronic devices such as Ipads®, and the like. Any operable device that has a user interface and a display is contemplated. While only two devices 104, 108 and two users 106, 110 are shown, the system 100 contemplates far more devices and users concurrently and/or sequentially operating on the system 100 consistent with the manner described herein.

Figure 7:
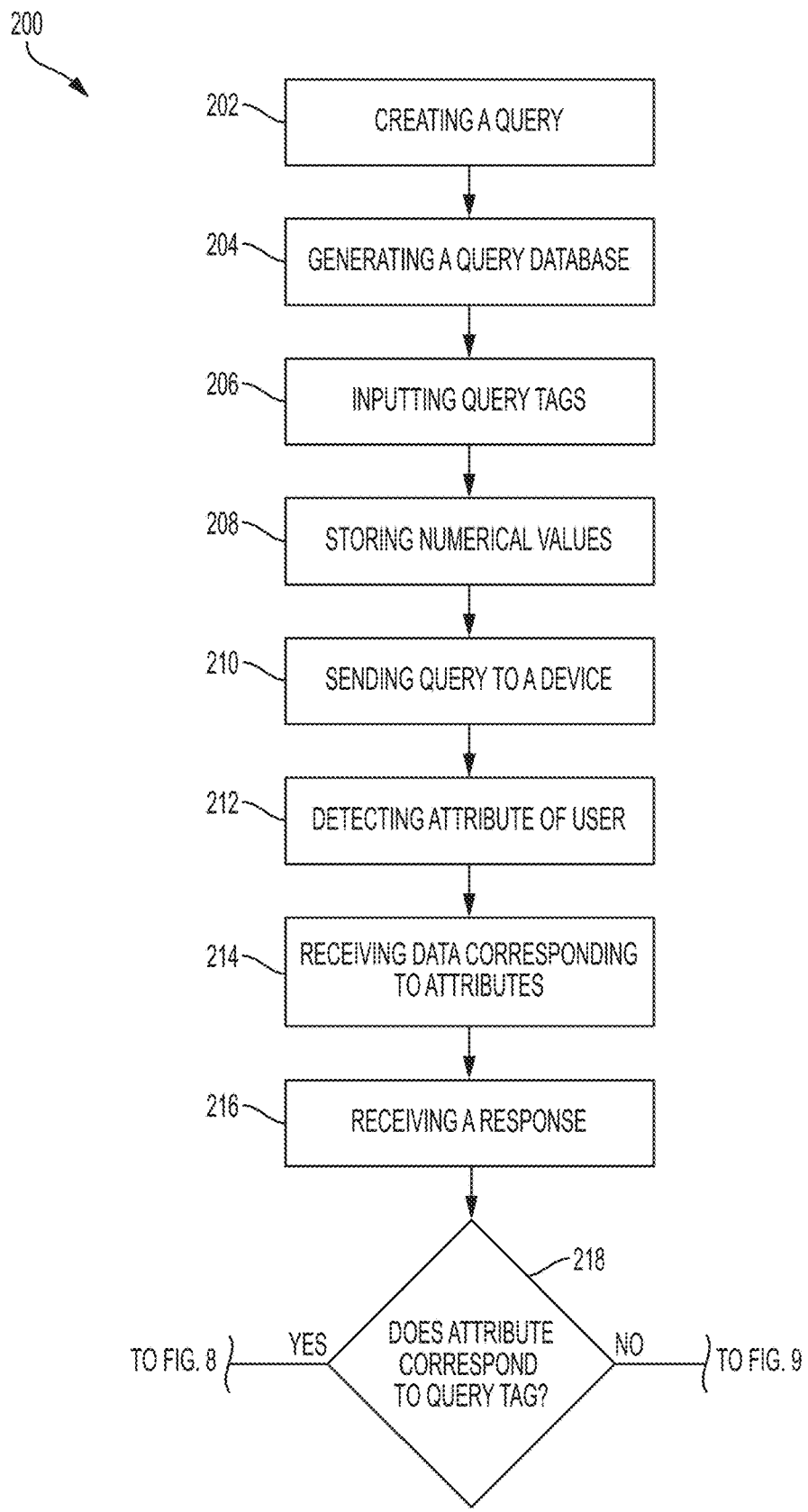
FIG. 7 illustrates an algorithm detailing a process flow enabled by the system of FIG. 1 for improving the detection and utilization of attributes of a user, in accordance with one embodiment.

FIG. 7 illustrates an algorithm 200 detailing a process flow enabled by the system of FIG. 1 for improving the detection and utilization of attributes of a user, in accordance with one embodiment. The algorithm includes a step 202 of creating a query such as the query 116, 118. This step 202 may be performed automatically by a computer processor, such as the server 102, for example, or may be performed by a person or group of people. For example, a content creator or content creating group may create the query 116, 118. The algorithm 200 may include a step 204 of generating a query database, such as the query database 114, associated with the query. The algorithm 200 may include a step 206 of inputting query tags, such as the query tags 130, 132 related to the queries corresponding to the expected attributes of the target user. The step 206 may be performed by the creators of the query. For example, if the query is an offer or advertisement, the step 206 may be performed by the marketing campaign team at the time that the offer is created. The algorithm 200 may include the step 208 of storing in the query database numerical values, such as the numerical values 134, 136, associated with each of the query tags. In one embodiment, the numerical values may initially be stored with a value of "0." In other embodiments, higher or lower values may be used.

The algorithm 200 may further include the step 210 of sending, by the computer processor, the query to a device, such as one of the devices 104, 108, operated by a user, such as one of the users 106, 110. For example, the query may be an offer or advertisement and the computer processor may be an ad server as described hereinabove. In other embodiments, the query may be an email query. In still other embodiments, the query may be a push notification or the like. The algorithm 200 may include a step 212 of detecting a plurality of attributes of the user of the device. The detecting may be performed, for example, by a detecting circuit such as the detecting circuit 112. The detection circuit may detect attributes at the time that the user responds to a query (i.e. at step 216 described herein below) or may be detected and accumulated prior to the query being sent by the computer processor to the user through the user device. Once these attributes have been detected, the attributes may be converted into data that may be processed by the computer processor. The algorithm 200 may include a step 214 of receiving, by the computer processor, the data corresponding to the detected plurality of attributes of the user.

Furthermore, the algorithm 200 may include a step 216 of receiving, by the computer processor, a response from the first user related to the query. The response may include various types of replies or reactions from the user. For example, the response may be accepting query, rejecting the query, viewing the query, exploring the query, opening the query, ignoring the query, or any other response.

Figure 8:
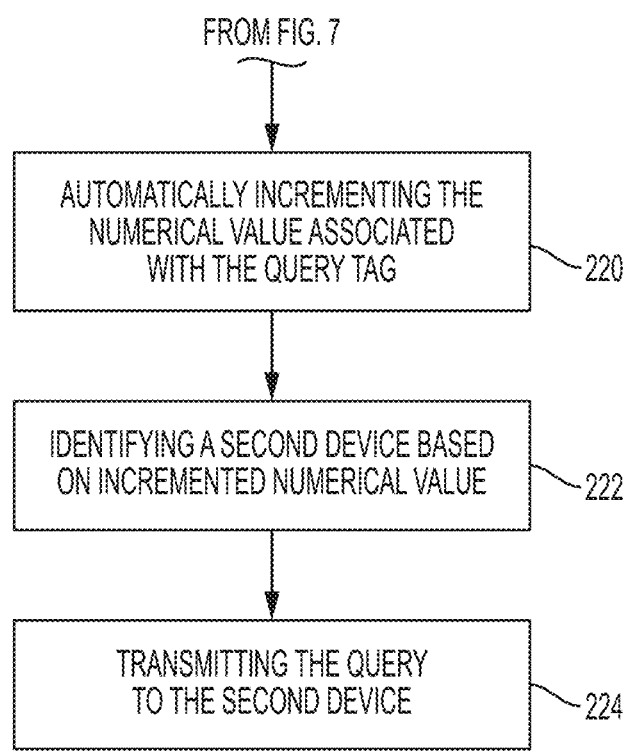
FIG. 8 illustrates a continuation of the algorithm of FIG. 7, detailing a process flow enabled by the system of FIG. 1 for improving the detection and utilization of attributes of a user, in accordance with one embodiment.
Figure 9:
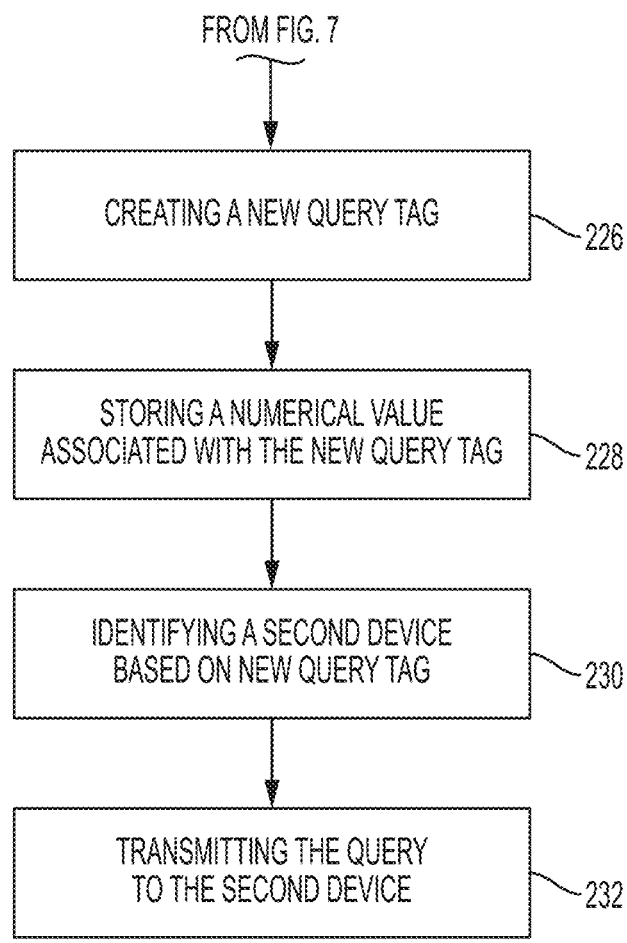
FIG. 9 illustrates another continuation of the algorithm of FIG. 7, detailing a process flow enabled by the system of FIG. 1 for improving the detection and utilization of attributes of a user, in accordance with one embodiment.

Furthermore, the algorithm may include a step 218 of determining whether one of the plurality of detected attributes corresponds to a query tag. FIG. 8 illustrates a continuation of the algorithm of FIG. 7, detailing a process flow enabled by the system of FIG. 1 for improving the detection and utilization of attributes of a user, in accordance with one embodiment. The process flow of FIG. 8 is performed if it is determined that a detected attribute corresponds to a query tag. FIG. 9 illustrates another continuation of the algorithm of FIG. 7, detailing a process flow enabled by the system of FIG. 1 for improving the detection and utilization of attributes of a user, in accordance with one embodiment. The process flow of FIG. 9 is performed if it is determined that the detected attribute does not correspond to a query tag.

Referring to FIG. 8, the algorithm 200 may include a step 220 of automatically incrementing based on the response, by the computer processor, the numerical value or values associated with each of the plurality of query tags that corresponds with each of the detected plurality of attributes. This incrementing may include either adding or subtracting a number from the numerical value to create a new incremented value. For example, if the query is rejected, the incrementing may subtract a 1 from a numerical value associated with each of the query tags that corresponds with the detected attribute. If the query is accepted, the incrementing may add a 1 to the numerical value associated with each of the query tags that corresponds with the detected attribute. In other embodiments, a rejected query may not subtract a number. Similarly, if some other response is provided such as viewing the query, the increment may be smaller than the increment if the response is to accept the query. Each type of response (i.e. accepting the query, rejecting the query, viewing the query, exploring the query, opening the query, ignoring the query) may incorporate a different incremental value, either positive or negative, that is applied to the appropriate numerical values.

FIG. 4 illustrates the query database 114 of FIG. 2 after receiving data from the user database 120 of FIG. 3, in accordance with one embodiment. By way of example, when the first user 106 responds by accepting the first query 116, the numerical values 134a, 134b, 134c, 134d in the query database 114 are updated and incremented if appropriate when the query tags 130a, 130b, 130c, 130d correspond to the attributes found in the user tags 146a, 146b, 146c, 146d. Thus, the numerical value 134a is incremented because the user tag 146a corresponds to the "male" query tag 130a. The numerical value 134b is also incremented because the user tag 146b corresponds to the "over 30" query tag 130b. However, the numerical values 134c, 134d are not incremented, because the tags 146c and 130c do not correspond and the tags 146d and 130d do not correspond.

Similarly, when the second user 110 responds by accepting the second query 118, the numerical values 136a, 136b, 136c, 136d in the query database 114 are updated and incremented if appropriate when the query tags 132a, 132b, 132c, 132d correspond to the attributes found in the user tags 148a, 148b, 148c, 148d. Thus, the numerical value 136a is incremented because the user tag 148a corresponds to the "female" query tag 132a. The numerical value 136b is also incremented because the user tag 148b corresponds to the "under 30" query tag 132b. The numerical value 136c is also incremented because the user tag 148c corresponds to the "single" query tag 132c. However, the numerical value 136d is not incremented because the tags 148d and 132d do not correspond.

Referring back to FIG. 8, the algorithm may include a step 222 of identifying, by the computer processor, a second device of a second user, where the identifying is at least partially based on the incremented numerical value. For example, FIG. 5 illustrates the query database 114 of FIG. 2 after receiving additional data, in accordance with one embodiment. The additional data has numerical values that have been incremented hundreds of times after the first query 116 has been sent to and responded by hundreds of users. The numerical increments determine that suburban users have the highest hit rate, with an incremental value of 1000. As such, the processor may be configured to find additional users in a comprehensive user database similar to the user database 120 having hundreds of users. These additional users may each include a suburban location attribute tag. Referring back to FIG. 8, the algorithm 200 may include a step 224 of transmitting, by the computer processor, the query to the second device that was found based on an analysis of the incremented value or values. This transmitting step 224 may be conducted by the processor automatically. In other embodiments, the computer processor may instead make recommendations to a live user or operator as to additional users or devices to send the query to. These recommendations may be based on the incremented numerical value.

FIG. 9 illustrates another continuation of the algorithm 200 of FIG. 7, detailing a process flow enabled by the system of FIG. 1 for improving the detection and utilization of attributes of a user, in accordance with one embodiment. The algorithm 200 further includes creating, by the computer processor, a new query tag in the query tag database for each of the detected plurality of attributes that does not have a corresponding query tag in the query tag database. As shown in FIG. 4, automatically generated new query tags 138a, 138b are shown associated with the first query 116 and automatically generated new query tag 144a is shown associated with the second query 118. The new query tags 138a, 138b are created when the first user 106 responds by accepting the first query 116 and the user tags 146c, 146d does not correspond to any of the existing original query tags 130a, 130b, 130c, 130d. At this point, the server 102 generates or otherwise automatically creates the new query tags 138a, 138b to correspond to the user tags 146c, 146d. These are created having numerical values 142a, 142b that are incremented to 1. Similarly, the new query tag 140a is created when the second user 110 responds by accepting the second query 118 and the user tag 148d does not correspond to any of the existing original query tags 132a, 132b, 132c, 132d. At this point, the server 102 generates or otherwise automatically creates the new query tag 140a to correspond to the user tag 148d. The new query tag 140a is created having a numerical value 144a that is set to 1. In another embodiment, the new query tag 140 is created having a numerical value of 144 that is set to 0 and incremented to 1. Referring still to FIG. 9, the algorithm 200 may include a step 228 of storing, by the computer processor, a numerical value associated with each of the new query tan.

In one embodiment, if a user having user tags that do not match or correspond with query tags declines or rejects a query, no new query tags are automatically generated. In other embodiments, if a user with user tags that do not match or correspond with query tags declines or rejects a query, a new query tags is automatically generated and a numerical value associated with the query tag is created that starts with a negative number. In other embodiments, whenever the numerical value of a query tag drops below zero, the query may be automatically deleted by the server or computer processor.

In still other embodiments, the processor may include software configured to instruct the database to automatically delete queries when the numerical value associated with the query drops to a predetermined negative number. Still further, the processor may include software configured to instruct the database to automatically delete queries when the numerical value has not been positively incremented over a certain period of time. Still further, the processor may include software configured to instruct the database to automatically increment each numerical value associated with a query tag by a negative number at the end of a predetermined recurring period.

As shown in FIG. 9, the algorithm 200 further includes a step 230 of identifying, by the computer processor, a second device of a second user, wherein the identifying is at least partially based on the new query tag. By way of example, FIG. 5 shows an example of the first query 116 having a target user that is a male, over 30, having kids, and living in a suburban location. However, a higher incremental value of "female" relative to "male" is shown. As such, the processor may be configured to find additional users in a comprehensive user database similar to the user database 120 having hundreds of users. These new users may be female, rather than male. Similarly, FIG. 5 shows an example of the second query 118 having a target user that is a female, under 30, single, and living in an urban location. However, a higher incremental value of "rural location" relative to "urban location" is shown. As such, the processor may be configured to find additional users to be sent the second query in a comprehensive user database similar to the user database 120 having hundreds of users. These new users may come from a rural location rather than an urban location. Referring back to FIG. 9, the algorithm 200 may include a step 232 of transmitting, by the computer processor, the query to the second device that was found based on the new query tag. This transmitting step 232 may be conducted by the processor automatically. In other embodiments, the computer processor may instead make recommendations to a live user or operator as to additional users or devices to send the query to. These recommendations may be based on the new query tag automatically generated.

FIG. 5 further shows a third query 150. The third query 150 may be automatically created by an algorithm performed by a computer processor such as the server 102. This algorithm may include creating a new query based at least partially on the incremented numerical values stored in the query database associated with an old query. For example, referring to the first query 116 shown in the query database 114 of FIG. 5, more single females over 30 years old living in a suburban environment were actually responsive in a positive way to the first query 116. This information may be analyzed by the computer processor in order to generate the third query 150 automatically, which particularly targets single females over 30 living in a suburban location.

Figure 10:
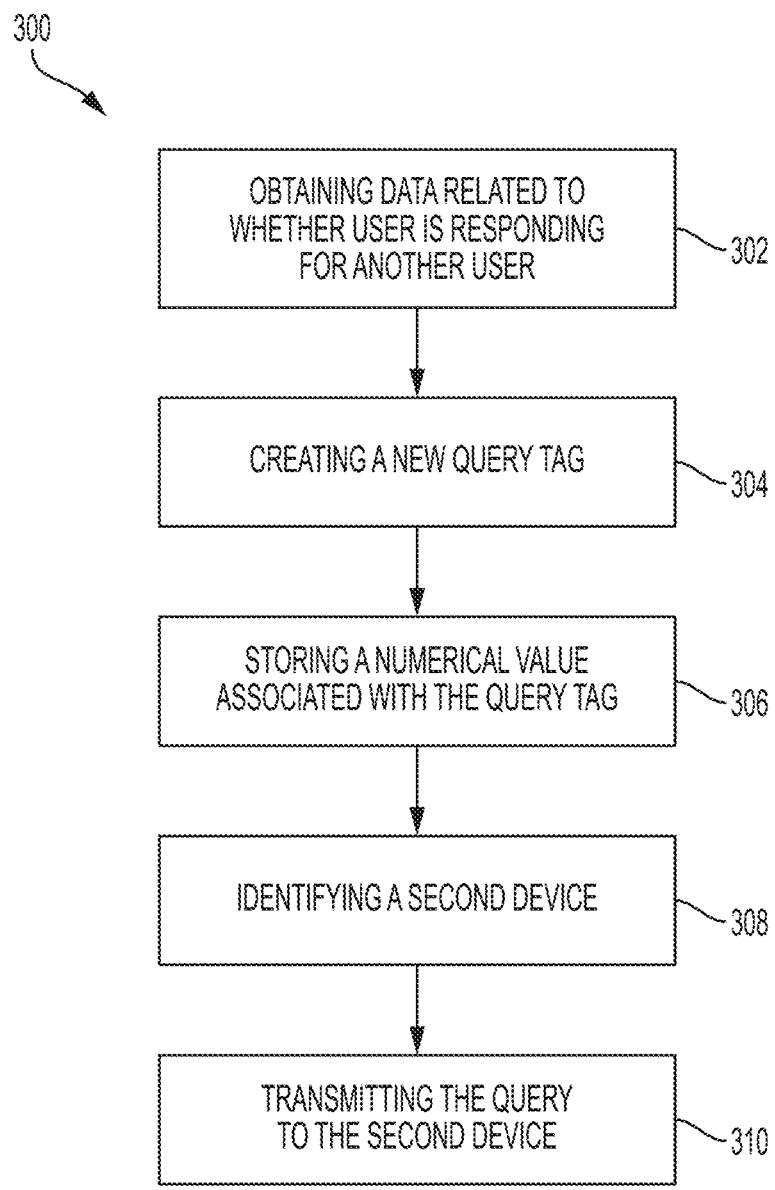
FIG. 10 illustrates another algorithm detailing a process flow enabled by the system of FIG. 1 for improving the detection and utilization of attributes of a user, in accordance with one embodiment.

FIG. 10 illustrates another algorithm 300 detailing a process flow enabled by the system of FIG. 1 for improving the detection and utilization of attributes of a user, in accordance with one embodiment. The algorithm 300 may include a step 302 of obtaining, by a computer processor such as the server 102, data related to whether a user of a device, such as the user 106 of the device 104, is responding to a query, such as the query 116 for another user. The algorithm 300 may include a step 304 of creating, by the computer processor, a query tag associated with whether the user of the device is responding to the query for another user. The algorithm 300 may include a step 306 of storing, by the computer processor, a numerical value associated with the query tag associated with whether the user of the device is responding to the query for another user.

FIG. 6 illustrates another query database 156 of the system of FIG. 1, in accordance with one embodiment. The query database 156 includes a fourth query 158. The fourth query includes original query tags 160, automatically generated query tags 162, and intended user query tags 164. Each of these query tags 160, 162, 164 include a corresponding numerical value 166. As shown, different types of query tags 158, 160, 162 may be distinctly separated into distinct subsections within the query database 156. Here, several intended users are identified: a spouse, a child, friends, and family. For example, if the query is an offer or advertisement, and the recipient of the advertisement is not positively responding to the offer or advertisement because they are interested in the underlying product or service, but they are purchasing the product or service on behalf of another user, the query database 156 monitors these transactions. The level of closeness to the recipient may also be stored and tracked in the query database 156.

Referring back to FIG. 10, the algorithm 300 may further include the step 308 of identifying, by the computer processor, a second device of a second user. The identifying may be based on the query tag associated with whether the user of the device is responding to the query for another user. For example, if it is found that an advertisement intended to target single women over 30 is being responded positively by men over 30 because the men are purchasing the gift for their spouse for mother's day, the algorithm and computer processor may automatically identify that the query should be provided to men over 30 instead of the originally intended women target. The algorithm 300 may further include the step 310 of transmitting, by the computer processor, the query to the second device.

Figure 11:
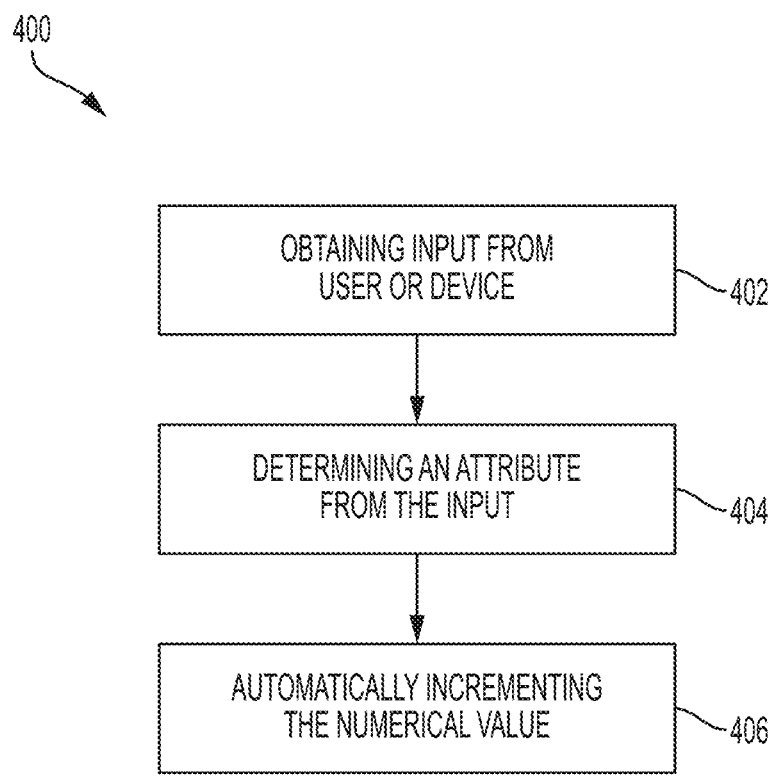
FIG. 11 illustrates another algorithm detailing a process flow enabled by the system of FIG. 1 for improving the detection and utilization of attributes of a user, in accordance with one embodiment.

FIG. 11 illustrates another algorithm 400 detailing a process flow enabled by the system of FIG. 1 for improving the detection and utilization of attributes of a user, in accordance with one embodiment. The algorithm 400 includes a step 402 of obtaining, by a computer processor such as the server 102, input text from a user of a device, such as the user 106 of the device 104. The algorithm may further include a step 404 of determining, by the computer processor, an attribute of the user based on the input text. The algorithm may further include automatically incrementing, by the computer processor, a numerical value such as the numerical value 134, associated a query tag, such as the query tag 130, that corresponds the attribute of the user based on the input text.

Figure 12:
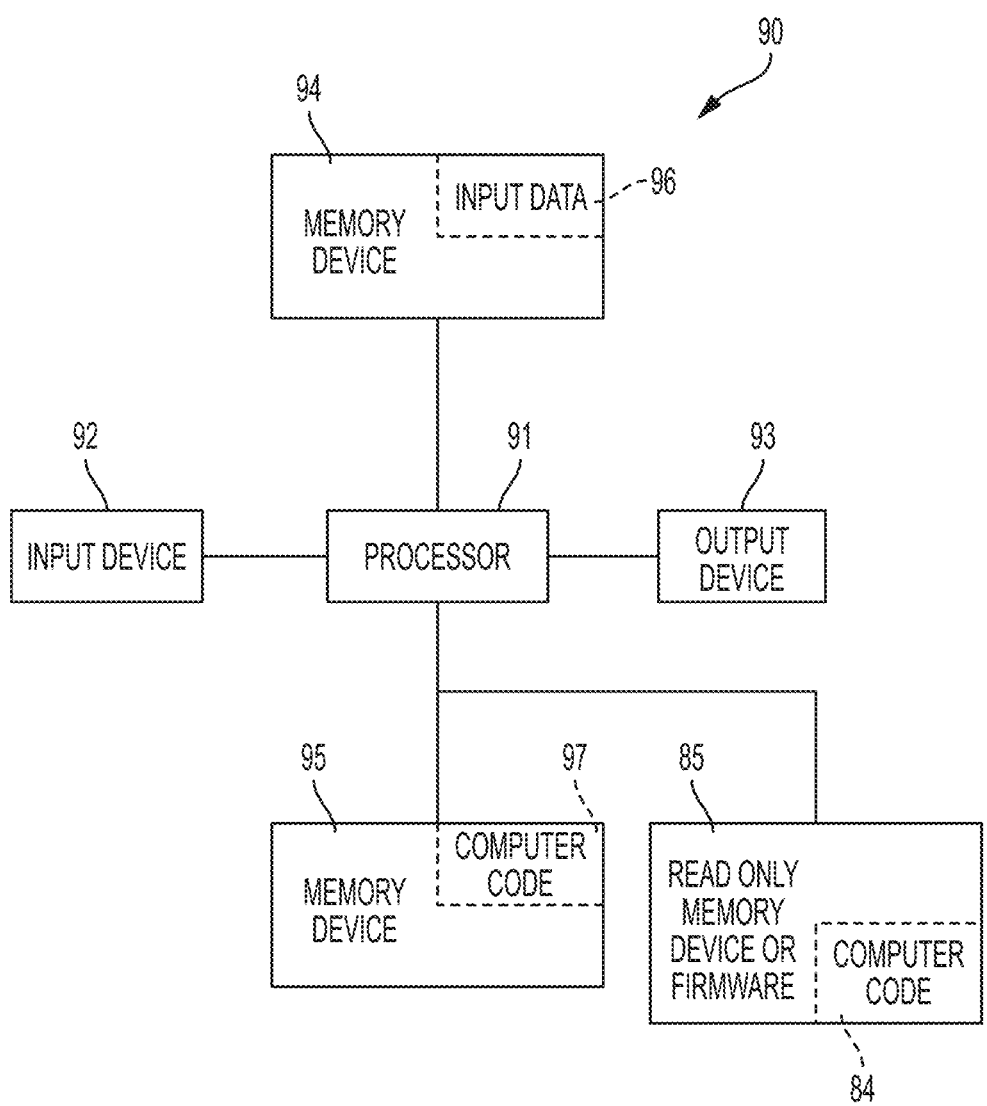
FIG. 12 illustrates a computer system used by the system of FIG. 1 for enabling a process for improving the detection and utilization of attributes of a user, in accordance with embodiments of the present invention.

FIG. 12 illustrates a computer system 90 (e.g., server 102, first device 104, second device 108, and detection circuit 112) used by or comprised by the system of FIG. 1 for improving the detection and utilization of attributes of a user, in accordance with embodiments of the present invention.

The computer system 90 illustrated in FIG. 12 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g. the algorithms of FIGS. 2-3) for enabling a process for enabling a process for supplying items to robotic apparatuses on an assembly line. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms (e.g., the algorithm of FIGS. 2-3) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithm) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program 97 may be stored as computer-readable firmware 85, or may be accessed by processor 91 directly from such firmware 85, rather than from a more dynamic or removable hardware data-storage device 95, such as a hard drive or optical disc.

Still yet, airy of the components of the present invention could be created, integrated, hosted, maintained, deployed, managed, serviced, etc. by a service supplier who offers to enable a process for virtually enabling hardware related tasks. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for enabling a process for virtually enabling hardware related tasks. In another embodiment, the invention provides a business method that performs the process steps of the invention on a subscription, advertising, and/or fee basis. That is, a service supplier, such as a Solution Integrator, could offer to enable a process for virtually enabling hardware related tasks. In this case, the service supplier can create, maintain, support, etc. a computer infastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 12 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other pro rain able data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method of improving detection and utilization of attributes of a user, said method comprising:
   sending, by a computer processor, a query to a device operated by a user of the device;
   receiving, by the computer processor, a response from the user related to the query;
   detecting, by the computer processor, attributes of the user based on the query;
   sending, by a computer processor, a second query to the user;
   receiving, by the computer processor, a second response to the second query;
   identifying, by the computer processor, using the detected attributes, whether the user is responding to the second query for a second user;
   creating, by the computer processor, a query tag associated with whether the user of the device is responding to the second query for a second user;
   storing, by the computer processor, a numerical value associated with the query tag associated with whether the user of the device is responding to the second query for a second user;
   identifying, by the computer processor, a second device of a third user, wherein the identifying is based on the query tag associated with whether the user of the device is responding to the second query for a second user; and
   transmitting, by the computer processor, the query to the second device.

2. The method of claim 1, wherein the second query includes a query database that includes:
   a plurality of query tags corresponding to expected attributes of a target user; and
   a numerical value associated with each of the plurality of query tags,
   the method further comprising:
   detecting a plurality of attributes of the user; and
   receiving, by the computer processor, data corresponding to the detected plurality of attributes of the user.

3. The method of claim 2, further comprising:
   automatically incrementing based on the response, by the computer processor, the numerical value associated with each query tag of the plurality of query tags that corresponds to each detected attribute of the detected plurality of attributes;
   creating, by the computer processor, a new query tag in the query tag database for each of the detected plurality of attributes that does not have a corresponding query tag in the query tag database; and
   storing, by the computer processor, a numerical value associated with each new query tag.

4. The method of claim 1, wherein the second query is an advertisement, and wherein the step of obtaining data related to whether the user of the device is responding to the advertisement for another user includes at least obtaining data related to whether the user of the device does not include attributes of a target population of the advertisement.

5. The method of claim 4, wherein the user is a recipient of the advertisement and wherein the recipient is responding to the advertisement on behalf of the second user, the method further comprising:
   determining, by the computer processor, the level of closeness between the recipient and the second user; and
   storing, by the computer processor, the level of closeness of the recipient and the second user in a query database.

6. The method of claim 1, further comprising:
   obtaining, by the computer processor, input text from the user of the device;
   determining, by the computer processor, an attribute of the user based on the input text; and
   automatically incrementing, by the computer processor, the numerical value associated a query tag that corresponds with attribute of the user based on the input text.

7. A computer program product, comprising a computer readable hardware storage device storing a computer readable program code, said computer readable program code executable by a processor enabling a connectivity circuit of a hardware device implements a method of improving detection and utilization of attributes of a user, said method comprising:
   sending, by a computer processor, a query to a device operated by a user of the device;
   receiving, by the computer processor, a response from the user related to the query;
   detecting, by the computer processor, attributes of the user based on the query;
   sending, by a computer processor, a second query to the user;
   receiving, by the computer processor, a second response to the second query;
   identifying, by the computer processor, using the detected attributes, whether the user is responding to the second query for a second user;
   creating, by the computer processor, a query tag associated with whether the user of the device is responding to the second query for a second user;
   storing, by the computer processor, a numerical value associated with the query tag associated with whether the user of the device is responding to the second query for a second user;
   identifying, by the computer processor, a second device of a third user, wherein the identifying is based on the query tag associated with whether the user of the device is responding to the second query for a second user; and
   transmitting, by the computer processor, the query to the second device.

8. The computer program product of claim 7, wherein the second query includes a query database that includes:
   a plurality of query tags corresponding to expected attributes of a target user; and
   a numerical value associated with each of the plurality of query tags,
   the method further comprising:
      detecting a plurality of attributes of the user; and
      receiving, by the computer processor, data corresponding to the detected plurality of attributes of the user.

9. The computer program product of claim 8, the method further comprising:
   automatically incrementing based on the response, by the computer processor, the numerical value associated with each query tag of the plurality of query tags that corresponds to each detected attribute of the detected plurality of attributes;
   creating, by the computer processor, a new query tag in the query tag database for each of the detected plurality of attributes that does not have a corresponding query tag in the query tag database; and
   storing, by the computer processor, a numerical value associated with each new query tag.

10. The computer program product of claim 7, wherein the second query is an advertisement, and wherein the step of obtaining data related to whether the user of the device is responding to the advertisement for another user includes at least obtaining data related to whether the user of the device does not include attributes of a target population of the advertisement.

11. The computer program product of claim 10, wherein the user is a recipient of the advertisement and wherein the recipient is responding to the advertisement on behalf of the second user, the method further comprising:
   determining, by the computer processor, the level of closeness between the recipient and the second user; and
   storing, by the computer processor, the level of closeness of the recipient and the second user in a query database.

12. The computer program product of claim 7, the method further comprising:
   obtaining, by the computer processor, input text from the user of the device;
   determining, by the computer processor, an attribute of the user based on the input text; and
   automatically incrementing, by the computer processor, the numerical value associated a query tag that corresponds with attribute of the user based on the input text.

13. A hardware device comprising a computer processor coupled to a computer-readable memory unit, said memory unit comprising instructions that when executed by the processor executes a method of improving the detection and utilization of attributes of a user, said method comprising:
   sending, by a computer processor, a query to a device operated by a user of the device;
   receiving, by the computer processor, a response from the user related to the query;
   detecting, by the computer processor, attributes of the user based on the query;
   sending, by a computer processor, a second query to the user;
   receiving, by the computer processor, a second response to the second query;
   identifying, by the computer processor, using the detected attributes, whether the user is responding to the second query for a second user;
   creating, by the computer processor, a query tag associated with whether the user of the device is responding to the second query for a second user;
   storing, by the computer processor, a numerical value associated with the query tag associated with whether the user of the device is responding to the second query for a second user;
   identifying, by the computer processor, a second device of a third user, wherein the identifying is based on the query tag associated with whether the user of the device is responding to the second query for a second user; and
   transmitting, by the computer processor, the query to the second device.

14. The hardware device of claim 13, wherein the second query includes a query database that includes:
   a plurality of query tags corresponding to expected attributes of a target user; and
   a numerical value associated with each of the plurality of query tags,
   the method further comprising:
      detecting a plurality of attributes of the user; and
      receiving, by the computer processor, data corresponding to the detected plurality of attributes of the user.

15. The hardware device of claim 14, further comprising:
   automatically incrementing based on the response, by the computer processor, the numerical value associated with each query tag of the plurality of query tags that corresponds to each detected attribute of the detected plurality of attributes;
   creating, by the computer processor, a new query tag in the query tag database for each of the detected plurality of attributes that does not have a corresponding query tag in the query tag database; and
   storing, by the computer processor, a numerical value associated with each new query tag.

16. The hardware device of claim 13, wherein the second query is an advertisement, and wherein the step of obtaining data related to whether the user of the device is responding to the advertisement for another user includes at least obtaining data related to whether the user of the device does not include attributes of a target population of the advertisement.

17. The hardware device of claim 16, wherein the user is a recipient of the advertisement and wherein the recipient is responding to the advertisement on behalf of the second user, the method further comprising:
  determining, by the computer processor, the level of closeness between the recipient and the second user; and
  storing, by the computer processor, the level of closeness of the recipient and the second user in a query database.

* * * * *